US012596955B2

(12) United States Patent　　　　(10) Patent No.: US 12,596,955 B2
Walker et al.　　　　　　　　　　　　(45) Date of Patent: Apr. 7, 2026

(54) REWARD FEEDBACK FOR LEARNING CONTROL POLICIES USING NATURAL LANGUAGE AND VISION DATA

(71) Applicant: Hitachi, Ltd., Tokyo (JP)

(72) Inventors: Andrew James Walker, Santa Clara, CA (US); Joydeep Acharya, Milpitas, CA (US)

(73) Assignee: HITACHI, LTD., Tokyo (JP)

( * ) Notice: Subject to any disclaimer, the term of this patent is extended or adjusted under 35 U.S.C. 154(b) by 925 days.

(21) Appl. No.: 17/869,528

(22) Filed: Jul. 20, 2022

(65) Prior Publication Data

US 2024/0028949 A1　　Jan. 25, 2024

(51) Int. Cl.
　　*G06N 3/092*　　　(2023.01)
　　*B25J 9/16*　　　　(2006.01)
　　*G06N 20/00*　　　(2019.01)
(52) U.S. Cl.
　　CPC ............. *G06N 20/00* (2019.01); *B25J 9/163* (2013.01); *G06N 3/092* (2023.01)
(58) Field of Classification Search
　　CPC .......... G06N 3/092; G06N 20/00; B25J 9/163
　　See application file for complete search history.

(56) References Cited

U.S. PATENT DOCUMENTS

| | | | | |
|---|---|---|---|---|
| 10,579,737 | B2 * | 3/2020 | Brixey | ................. G06F 40/169 |
| 12,001,320 | B2 * | 6/2024 | Liu | ..................... G06F 11/3684 |
| 2020/0276703 | A1 * | 9/2020 | Chebotar | ............... G06N 3/084 |
| 2021/0205988 | A1 * | 7/2021 | James | ...................... B25J 9/163 |
| 2022/0319141 | A1 * | 10/2022 | Liu | ....................... G06V 20/70 |
| 2023/0182296 | A1 * | 6/2023 | Sermanet | ................. B25J 9/163 |
| | | | | 700/245 |
| 2023/0271330 | A1 * | 8/2023 | Sundaralingam | ........ B25J 9/163 |
| | | | | 700/246 |

OTHER PUBLICATIONS

Radford, Alec et al. Learning Transferable Visual Models From Natural Language Supervision. arXiv: 2103.00020v1 [cs.CV] Feb. 26, 2021. pp. 1-48.

* cited by examiner

*Primary Examiner* — Beau D Spratt
(74) *Attorney, Agent, or Firm* — PROCOPIO, CORY, HARGREAVES & SAVITCH LLP

(57)　　　　　　　　ABSTRACT
Example implementations described herein involve systems and methods for providing a reward to a machine learning algorithm, which can include receiving an image, and a task description defined in text; slicing the image into a plurality of sub-images; executing an embedding model to embed the text of the task description and the sub-images to generate a distribution for the sub-images based on relevance to the task description; and generating the reward from the distribution for the sub-images.

9 Claims, 8 Drawing Sheets

REWARD FEEDBACK FOR LEARNING CONTROL POLICIES USING NATURAL LANGUAGE AND VISION DATA

BACKGROUND

Field

The present disclosure is generally directed to robotic systems, and more specifically, for reward feedback for learning control policies using natural language and vision data.

Related Art

In the related art, the robotic policies for various tasks are decided by classical hard-coded control methods. Recently however, methods in reinforcement learning (RL) have proven effective at learning such policies. The framework here is that the agent (the robot) takes in information about their environment, called the state, and aims to learn a policy that takes as input the current state and outputs the next action that should be made. Based on the next state that the robot arrives in after making their action, a reward is received. The reward gives the robot information about the action they made, with a larger reward telling the agent that the action that they made was good, and a smaller reward indicating that the action was not as good.

Rewards can fall under two basic categories: (1) sparse rewards and (2) dense rewards. A sparse reward carries with it relatively little information. For instance, a sparse reward might only tell the agent that the task has been completed, providing no other information. Dense rewards, on the other hand, give a feedback signal with more information about the intermediate steps before the task has been completed. The tradeoff though comes in the form that dense rewards are typically harder to construct, and generally require more delicate handcrafting for the specific task at hand.

In the related art, many strategies have been employed in the search for creating good reward functions. One particular related art strategy aims to use natural language to help craft a reward shaping function. That is, instead of an agent trying to optimize a reward RR, they instead replace this reward with something with more information by adding a function FF to create a new reward of the form:

$$R'=R+F$$

This art of choosing the appropriate F is called reward shaping. The related art implementations involve a method that takes a language instruction $\ell$ and a sequence of actions a the agent has made. A potential function is then learned to tell if the pair ($\ell$, a) is relevant to the task at hand which is used to define the shaping function F. Here, the potential function must be learned from historical data, and the language instruction $\ell$ is fixed for the particular task. Such a method requires a technical setup and can be quite time-consuming to build a good shaping function.

SUMMARY

Thus, there is a need to develop methods by which one can reliably build reward functions that carry more information, and yet are relatively easy to craft. This is particularly important in modern manufacturing, where the production lines must be quickly reconfigured to accommodate high-mix low-volume dynamic operations. In this context, the robotic agent must quickly learn new policies since the nature of the task may change frequently. The example implementations described herein focus on in this work a method concerning the creation of the reward signal provided to the agent.

While the use of natural language in reinforcement learning has already been studied to some extent, there are a lack of techniques that can be used without requiring historical training data or that are tailored for a particular task.

When tasks can change frequently and a policy needs to be updated or relearned, this requires generating a feedback signal (the reward) that provides meaningful feedback to the agent to help redesign the policy. There is a general need for methods that generate a useful reward signal that does not rely on overly handcrafted polishing to help learn an effective policy.

Moreover, while the use of natural language is important and has been studied to some extent to help learn policies, there are comparatively less works that focus on the optimal way to phrase a language instruction to inform the policy—so-called "prompt engineering". Careful choice of wording can have a great impact on learning. The semantic content that is carried in the language instruction can guide the agent towards an optimal policy, or if not phrased appropriately, may leave the agent unable to understand how to complete the task.

For instance, consider the instruction "Lift the pallet onto the stack of other ones". Such an instruction can be potentially ambiguous, as there may be multiple stacks of pallets in the field of view of the robot, and without a way to attend to the intended stack, a poor policy may be learned. Thus, there is a need to optimize the use of language in learning policies.

Aspects of the present disclosure can involve a method for providing a reward to a machine learning algorithm, which can include receiving an image, and a task description defined in text; slicing the image into a plurality of sub-images; executing an embedding model to embed the text of the task description and the sub-images to generate a distribution for the sub-images based on relevance to the task description; and generating the reward from the distribution for the sub-images.

Aspects of the present disclosure can involve a computer program, storing instructions for providing a reward to a machine learning algorithm, the instructions involving receiving an image, and a task description defined in text; slicing the image into a plurality of sub-images; executing an embedding model to embed the text of the task description and the sub-images to generate a distribution for the sub-images based on relevance to the task description; and generating the reward from the distribution for the sub-images. The computer program and instructions can be stored in a non-transitory computer readable medium and the instructions can be executed by one or more processors.

Aspects of the present disclosure can involve a system for providing a reward to a machine learning algorithm, which can include means for receiving an image, and a task description defined in text; means for slicing the image into a plurality of sub-images; means for executing an embedding model to embed the text of the task description and the sub-images to generate a distribution for the sub-images based on relevance to the task description; and means for generating the reward from the distribution for the sub-images.

Aspects of the present disclosure can involve a system, which can involve one or more robotic control systems, the one or more robotic control systems configured to control one or more robots; and an apparatus, including a processor configured to provide a reward to a machine learning algorithm controlling the one or more robotic control systems, the processor configured to receive an image, and a task description defined in text; slice the image into a plurality of sub-images; execute an embedding model to embed the text of the task description and the sub-images to generate a distribution for the sub-images based on relevance to the task description; and generate the reward from the distribution for the sub-images.

DETAILED DESCRIPTION

Figure 1:
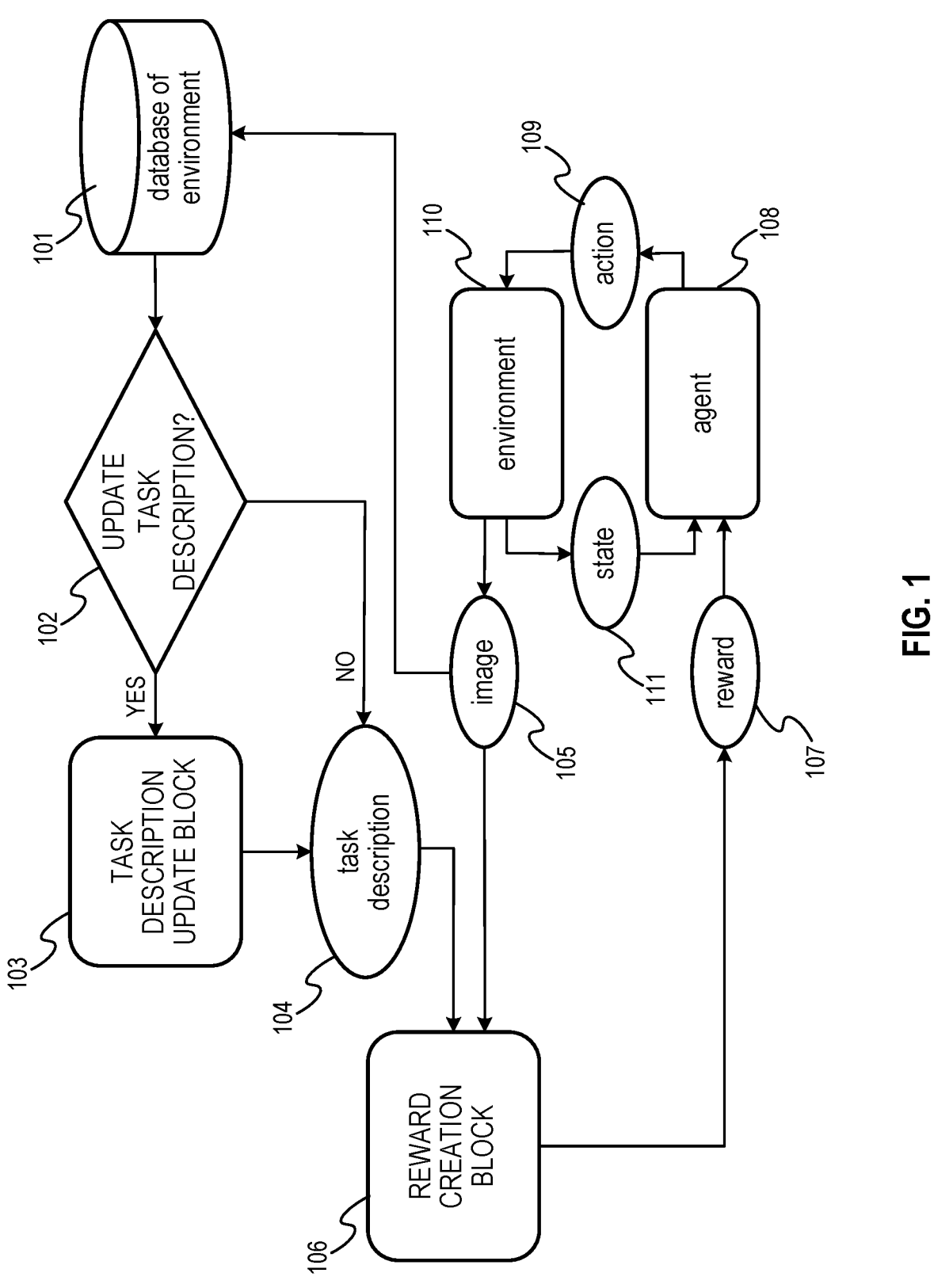
FIG. 1 illustrates the main flow diagram upon which example implementations described herein may be applied.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

The core of the present disclosure involves the following: there is a need to design a reward function obtained from an optimized task description through text information and annotation, along with an image from the processing tasks. Example implementations use this data to then calculate a probability distribution based on the similarity of the task description and each image, which can then be used to output the reward value indicating the completion of the task or subtask.

The present disclosure utilizes the schema of inverse reinforcement learning, where there is potentially no reward function, and it must be learned from observations taken from the environment. FIG. 1 illustrates the main flow diagram upon which example implementations described herein may be applied. The example implementations involve a method that alternates between choosing a task description 103 and a reward creation strategy 106 using available image data 105 and the learned task description 104. This reward provides a feedback signal to the agent 108 that can be used to update the current policy that is used. That is, after computing the reward, this is processed in the same way as the common reinforcement learning framework, where the state 111 from the environment 110 is observed, and both the state 111 and reward 107 just computed are sent to the robotic agent 108, where the policy can potentially be updated using this information. After receiving this state and reward data, the agent can choose an action 109 that will update its current state 111 within the environment 110. This state information could include the same image 105 used in the generation of the reward or could include other variables that yield information about the environment at the current time step.

After collecting enough images in a database 101 from the environment as the agent 108 learns how to solve the task, a decision is made as to whether or not the task description is to be updated at 102, based on how far along the agent is in learning the task. As more images are collected from successful episodes (that is, trials in which the robot successfully completed the task), these can be used to refine the description of the task 104 that is used in the generation of the reward 106. This is done via a task description update step 103, where a worker supplies keywords related to a component of the task, and then based on image data that has already been collected, the task description is thereby optimized. This optimized task description is not expressed in natural language, but rather is embedded in a certain "semantic space" that preserves the semantic content needed to understand the task.

Once the optimized task description 104 is produced, the reward signal 107 is generated using a specific strategy 106. In example implementations, the method can rely on taking an image 105 from the environment and making a comparison between the semantic content of the image and the task description. Based on the similarity of their semantic contents, the reward signal 107 is produced. This reward could be used by itself, or it could be used as a shaping function to augment the information within an existing reward.

Figure 2:
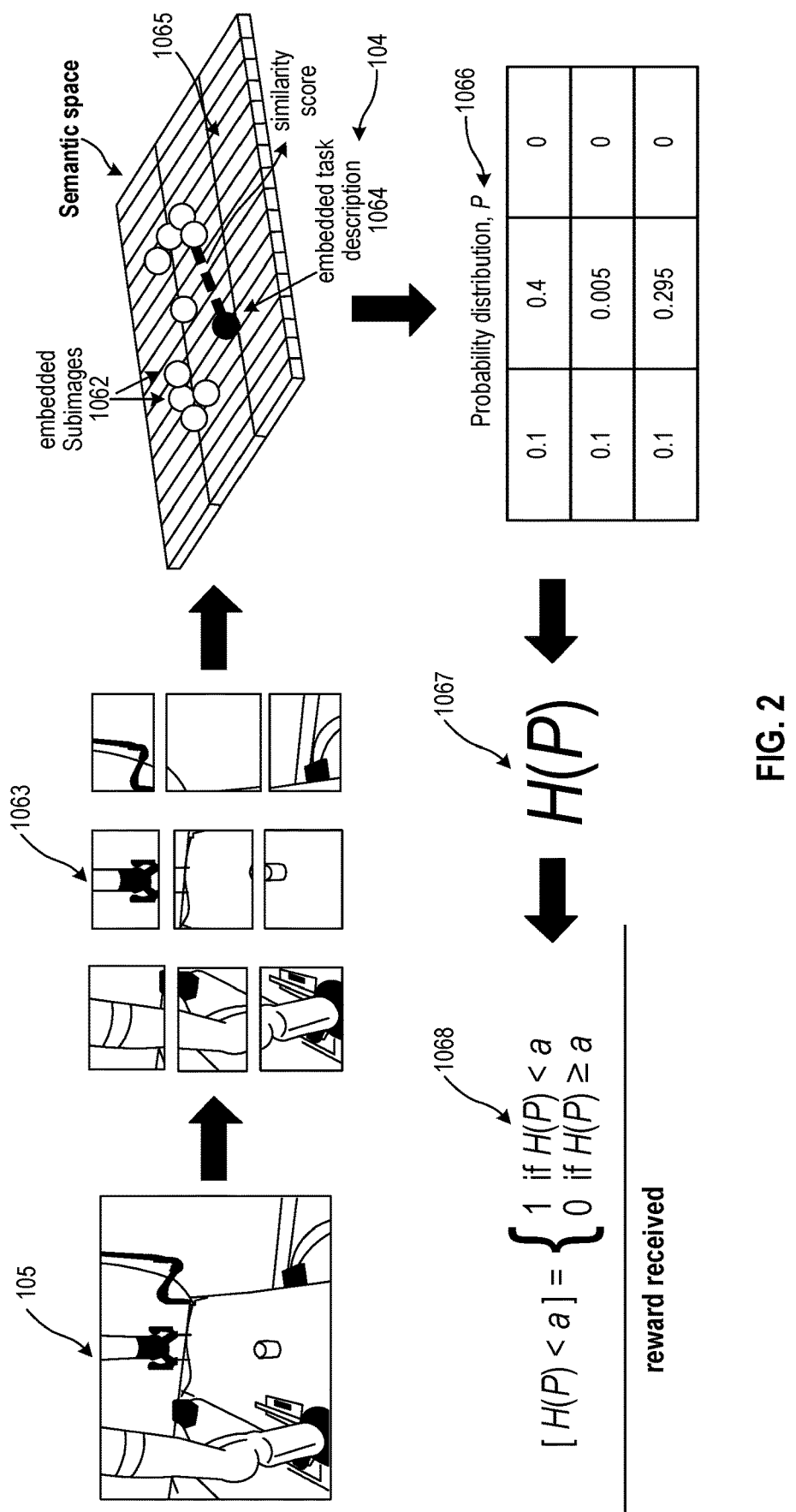
FIG. 2 illustrates an example implementation for producing a reward.

FIG. 2 illustrates an example implementation for producing a reward. In FIG. 2, an example of how the invention implementation is used to produce a reward is shown. An image from the robot 105, is produced as the robot learns how to perform the task. Then, the image is broken into subimages 1063 inside the reward creation block 106. These subimages, as well as the task description, are placed in the semantic space 1062, 1064, and then compared 1065 to get a similarity score between each subimage and the task description. This can be turned into a probability distribution 1066 that reflects the likelihood that the subimage matches the task description (e.g., relative to the other subimages). For instance, in the example of FIG. 2, the probability distribution is 0 in the right column, because those subimages have nothing to do with the task description. On the other hand, the bottom center and top center subimages are most closely related to the task description, and so have the highest probability associated to them. From this distribution, a function that give an aggregate statistic about how well the distribution relates to the task overall can thereby be computed. A distribution that is spread out evenly across all subimages contains little information relevant helpful for solving the task, and thus has high entropy. Meanwhile, a distribution with all its probability mass concentrated in one subimage has 0 entropy. Thus entropy $H(P)$ 1067 of a distribution could be used to define a reward 1068 if it is below a certain threshold. Other functions can be used, such as the mean or maximum, to generate a reward depending on the desired implementation.

Figure 3:
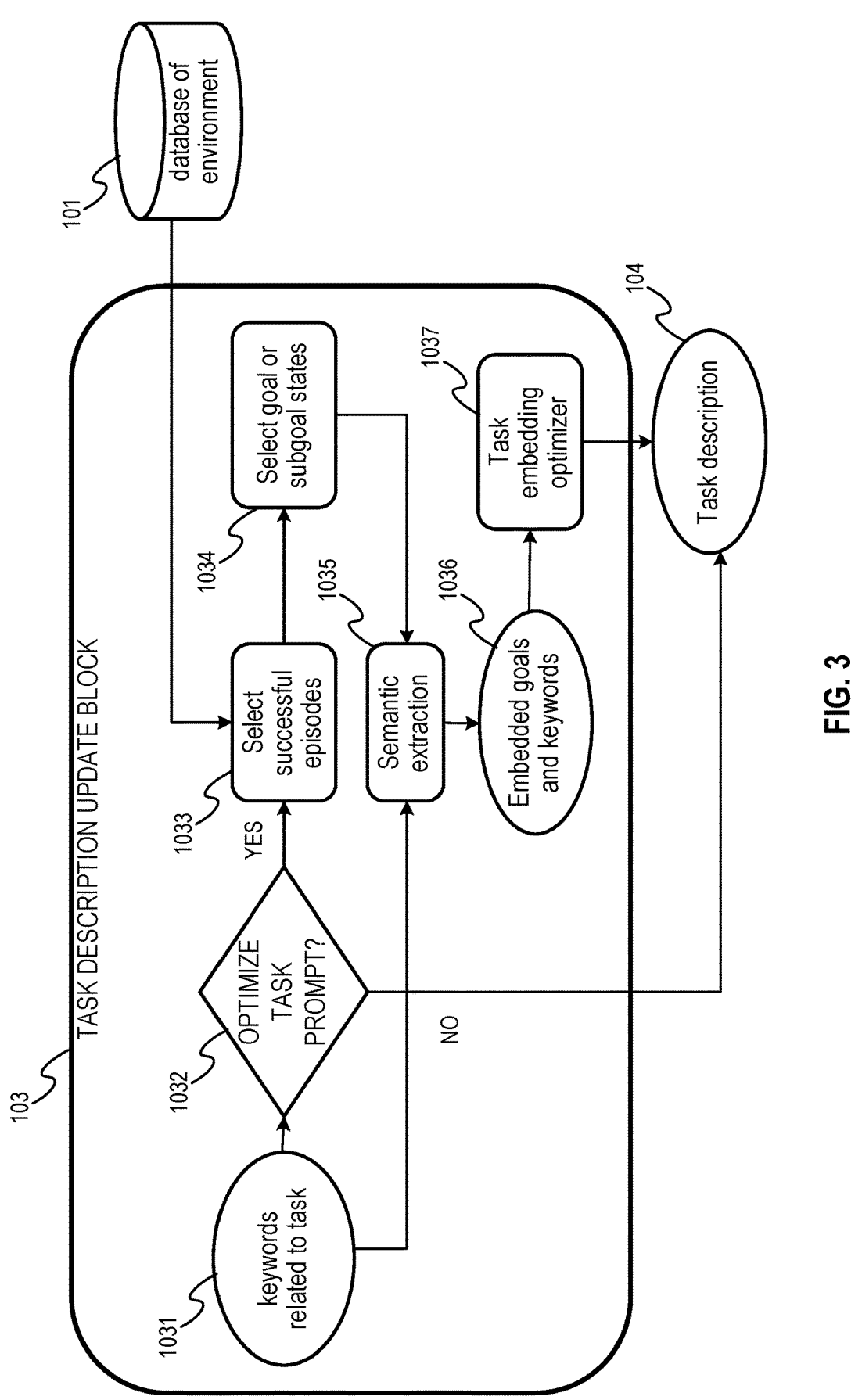
FIG. 3 illustrates the details of the task description update block, in accordance with an example implementation.

FIG. 3 illustrates the details of the task description update block 103, in accordance with an example implementation. To update the task description, a worker selects some basic keywords or a short text prompt related to the task 1031. These keywords can involve, but are not necessarily limited to, subgoals or goals that the robotic agent must achieve in the task, or they could just be words related to the task. For instance, if a task for the robotic agent is to pick up a screw and place it into a hole, the input keywords could involve "pick up a chip and place into board" or could simply involve just the keywords "chip" and "board".

Now, if the user wishes to optimize the task prompt 1032, then from the database of images from the environment 101, images from successful episodes are extracted at 1033. A successful episode means that a sequence of steps in which the attempt by the robotic agent at completing the task resulted in a success. This step can only be done if the database of images from the environment is nonempty. If the database 101 is empty, then the keywords 1031 must be directly used as the task description 104, essentially as an initialization step.

This selection of successful episodes step 1033 can be conducted automatically by taking a sequence of images $X_1, \ldots, X_T$ and then looking at the corresponding rewards $R_1, \ldots, R_T$ that are received at each of their timesteps. A simple function $$G(R_1, \ldots, R_T) \in \{0,1\}$$

can be used to decide whether or not an episode was a success, where $G(R_1, \ldots, R_T)=1$ means that the episode was a success, and $G(R_1, \ldots, R_T)=0$ means the episode was not a success. For instance, in the instance of goal conditioning where the reward $R_t=1$ is only received if the agent has reached a goal state, and otherwise $R_t=0$, then the function F simply becomes $$G(R_1, \ldots, R_T) = \begin{cases} 1 \text{ if any of the } R_t > 0 \\ 0 \text{ otherwise} \end{cases}.$$

Once the successful episodes are selected 1033, another subset is selected from the images belonging to these successful images, the subset that corresponds to goals or subgoals related to the input keywords 1034. This could be done either through manual annotation or an unsupervised strategy. In the unsupervised case, this could be done by ranking which images most closely match the semantic content of the embedded keywords. In any case, after the images corresponding to the keywords are selected, both the keywords and these selected images are pushed through a semantic extractor 1035. The output of the semantic extractor is an embedding of both the subgoal/goal images and the selected keywords in semantic space. Now that this multi-modal data lies in a common space, calculations can be made more directly. This data is pushed through an optimizer 1037 that aims to find the optimal point in semantic space that is closest to this data. This could be done in a variety of ways, such as methods that simply take the centroid or more complicated optimizers that minimize a loss with respect to this data. The output though here is the optimal task description 104. This task description is not expressed in natural language, but rather is expressed as a vector in semantic space, and thus carries the semantic content most relevant to the selected images 1034 and keywords 1031 that were identified at the beginning of the block.

Figure 4:
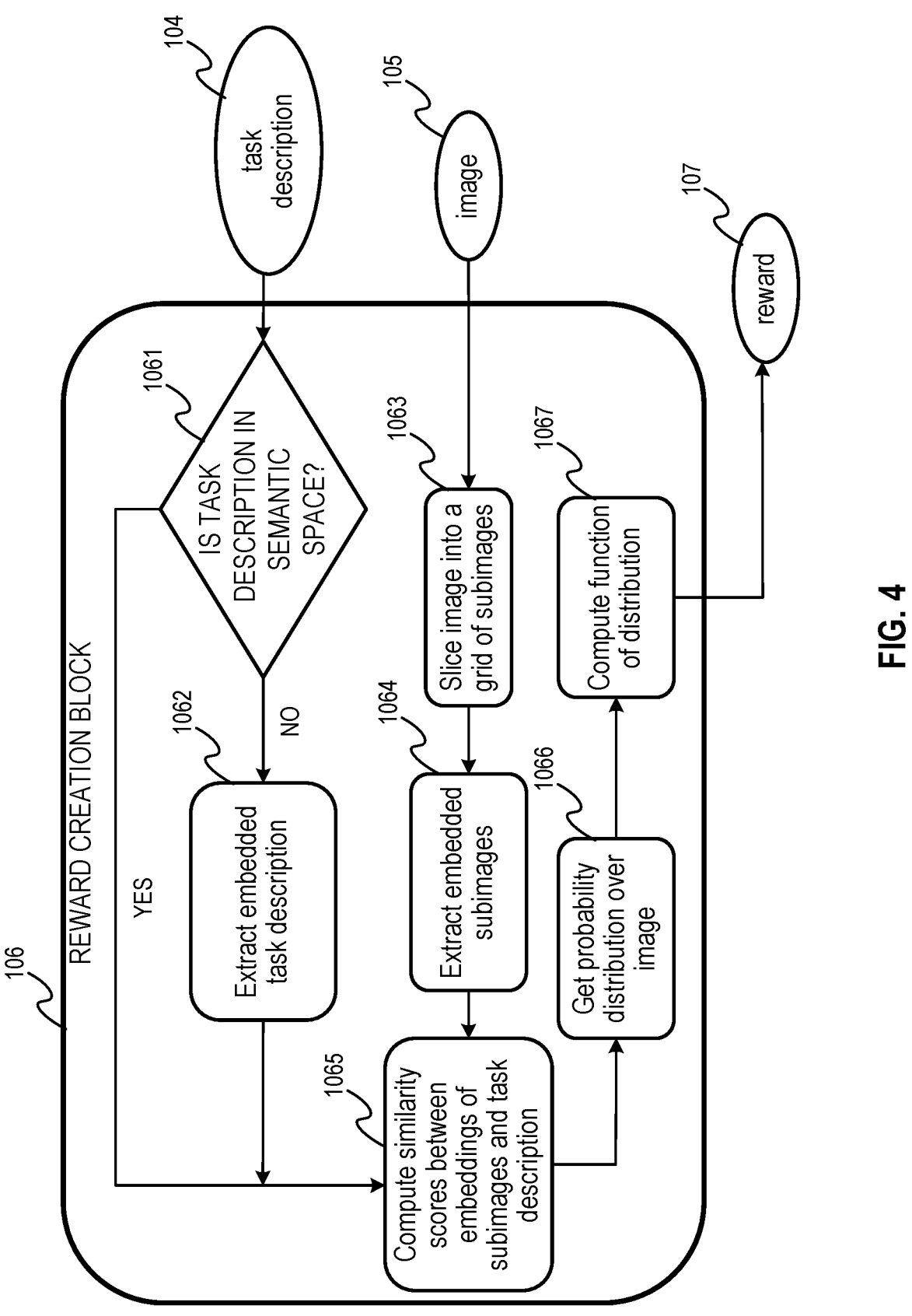
FIG. 4 illustrates the details of the reward completion block, in accordance with an example implementation.

Once the task description 104 is specified and an image 105 is obtained from the environment, a reward can be computed based on the action that led us to the state that produced this image. FIG. 4 illustrates the details of the reward completion block 106, in accordance with an example implementation. The output of this block is the reward signal that is fed to the agent to update the policy. At first, the flow looks to see whether or not the task description 104 is expressed in natural language or lives in semantic space 1061. The former case would happen if no images from the environment have been completed and only supplied keywords 1031 have been received as the task description 104, such as in the initialization step. If the former case is true (NO), then the flow proceeds to take the task description expressed in natural language and push it through the semantic extractor to get an embedded task description 1062. Subsequently, the flow then takes the image 105, and slices the image X into an L×L grid of subimages $X_{ij}$, which refers to the subimage of X in the $i^{th}$ row and $j^{th}$ column of the grid. Each of these subimages are then pushed through a semantic extractor 1064 to get embeddings of each of these subimages in semantic space. Using an appropriate measure of similarity $s(\cdot,\cdot)$ such as the dot product, the flow can thereby compute, for each subimage $X_{ij}$ in the grid, the similarity 1065 to the embedded text description, which is denoted as z.

Note that $z=\emptyset(c)$, where c are the keywords we used to define the task description if the flow is in the initialization phase. That is, the flow computes $$s_{ij}=s(z,\emptyset(X_{ij})).$$

These similarities can then be turned into a probability distribution over the grid, such as by applying softmax (with temperature $\lambda$:

$$P_{ij} = \frac{\exp(\lambda s_{ij})}{\sum_{i',j'} \exp(\lambda s_{i',j'})} \in (0, 1).$$

Figure 5:
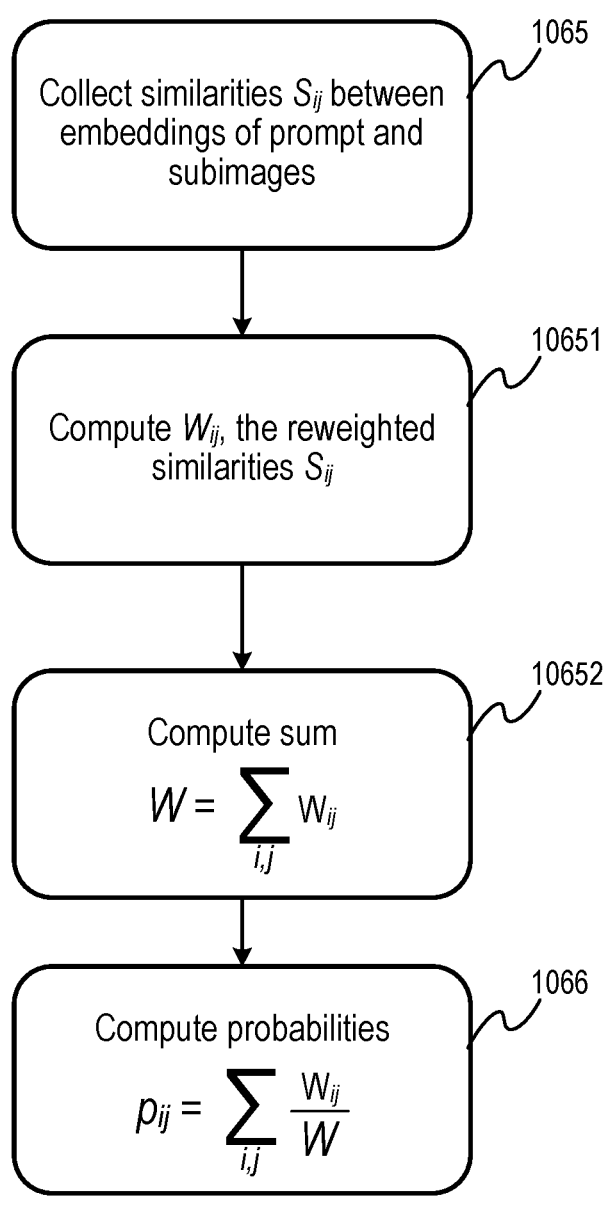
FIG. 5 illustrates the flow diagram for the computation of probabilities, in accordance with an example implementation.

More generally, the computation of this probability distribution can be done as described in FIG. 5. FIG. 5 illustrates the flow diagram for the computation of probabilities, in accordance with an example implementation. The similarities $s_{ij}$ 1065 are reweighted into $w_{ij}$ 10651, which are all positive. Then, their sum $W=\Sigma_i$, $w_{ij}$ 10652 is computed, and from here the probabilities $p_{ij}=w_{ij}/W$ 1066 can thereby be obtained. This probability distribution 1066 can be interpreted as the probability that subimage $w_{ij}$ most closely matches the task description z, relative to the other images in the grid.

From here, the probability distribution 1067 can be processed in accordance with any desired implementation to produce the reward signal. There are several ways the reward signal can be produced by pushing the distribution through a certain function 1067. For instance, the entropy can be computed as follows $$H := H(p_{ij}) = -\sum_{i,j} \log(p_{ij}) \cdot p_{ij}$$

to generate the reward signal. The idea being that there is more information contained in fewer subimages $X_{ij}$ relevant to the task description z if the entire image came from a state that reflects the description of the task 104. Images X that correspond to states where the entropy H<v for a certain threshold v can thereby be determined.

The output F of this block, which depends on an image X and a task description z, can be used to define the signal:

$$F(X, z) = \begin{cases} 1 & \text{if } H(P_{i,j}) < v \\ 0 & \text{otherwise} \end{cases}.$$

From here, the reward signal 107 can be defined using purely this signal F(X,z), or can be treated as a reward shaping function, in that if an existing reward R is already obtained, then the reward can be modified by using reward shaping to get another reward function R'=R+F.

Figure 6:
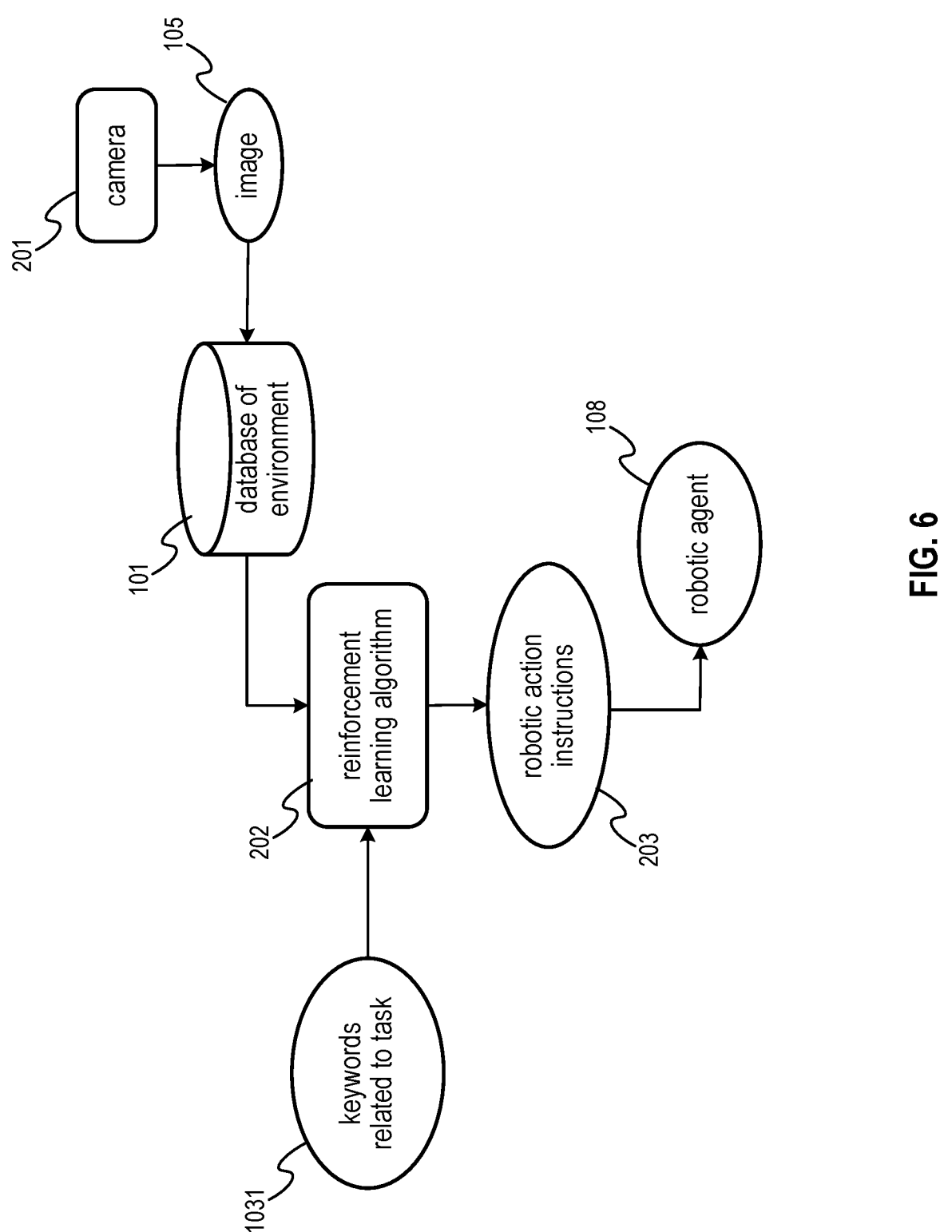
FIG. 6 illustrates an example physical environment upon which example implementations can be applied.

FIG. 6 illustrates an example physical environment upon which example implementations can be applied. The example implementations described herein can be set up as a dockerized microservice sitting in a device near the robot. This device is responsible for computing the policy that gives the robot the actions it needs in order to complete the task. This policy is learned via the reinforcement learning algorithm 202, which is augmented by the example implementations described herein. A variety of RL algorithms could be used, such as DDPG, SAC, PPO, etc. It is assumed in our environment that there is a camera 201 that provides images 105 that are captured as the robot attempts to complete the task. These images are stored in a database 101 sitting on another device, but could also be sitting on the same device of the RL algorithm—so long as the device used for computing the RL algorithm is able to access these images.

Once the policy computes the action using the RL algorithm 202 based on the current state, an action instruction for the robot 203 is sent to the device that talks to the robot. This could again be the same device that the RL algorithm runs on. From here, this action is processed, and communicates to the robot 108 to move to the next action specified by the policy. Once the action is made, another camera image is taken and the process repeats. The proposed reward method can use human input in the form of keywords 1031 related to the task that the robot is trying to work on. These can be input into the edge device where the RL algorithm operates.

Through the example implementations described herein, a better reward function can thereby be constructed for use in learning robotic policies using reinforcement learning. This will have the immediate effect of allowing such algorithms to learn robotic policies in shorter time, reducing the need for highly customized rewards that are tailored for each individual task. In some cases, all that would be required is a single language instruction, and potentially a small amount of additional annotation. Besides reducing the actual learning time, the resource requirement will generally be lower with the proposed solutions. In example implementations, it is possible to only require a camera to observe the environment, while the need for detailed sensing requirements that can provide more complex feedback to the robot can be reduced accordingly. Constructing this complex feedback generally requires significant engineering resources. On the other hand, the example implementations can be utilized without detailed technical knowledge and requires minimal time investment.

Figure 7:
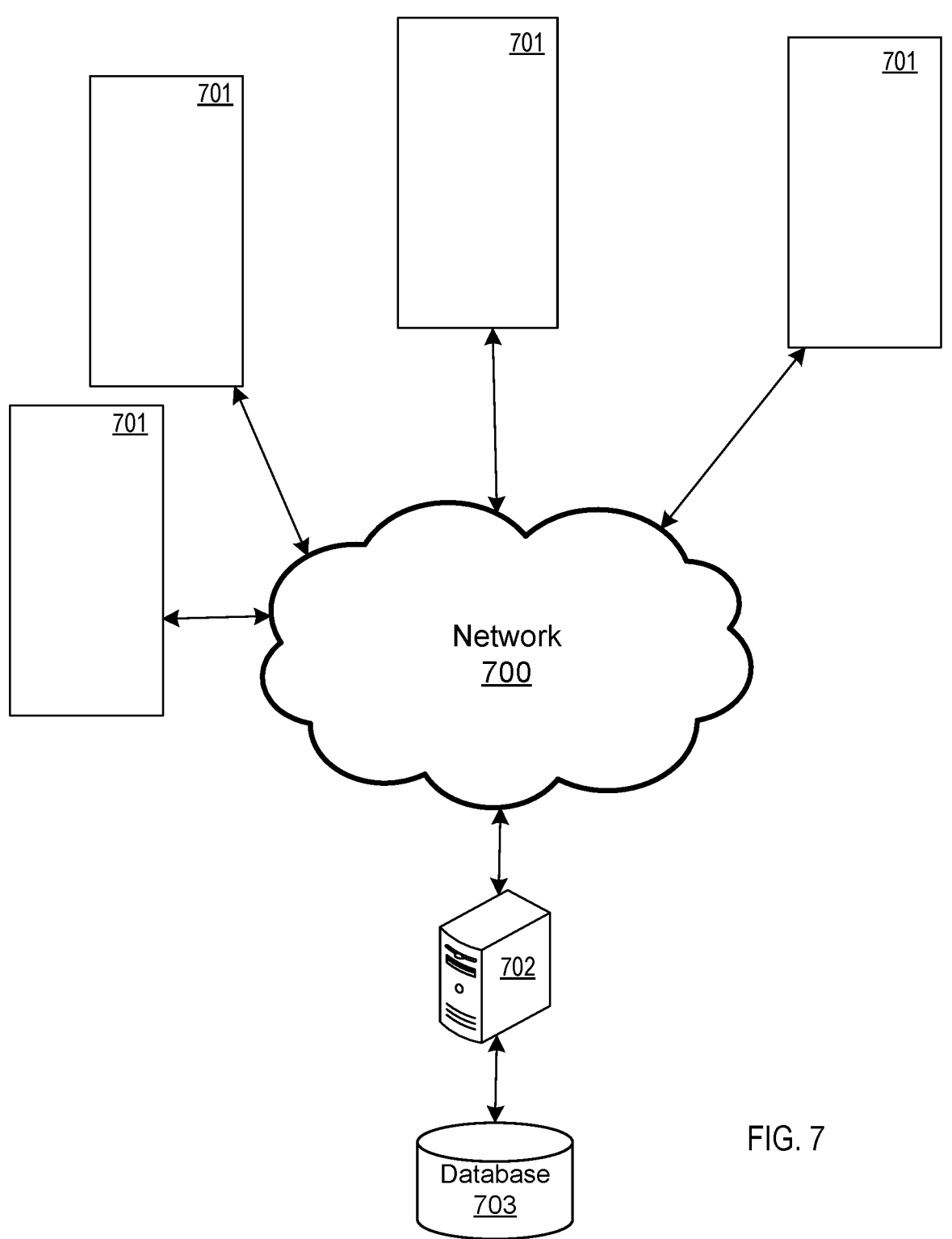
FIG. 7 illustrates a system involving a plurality of robotic systems networked to a management apparatus, in accordance with an example implementation.

FIG. 7 illustrates a system involving a plurality of robotic systems networked to a management apparatus, in accordance with an example implementation. One or more robotic control systems 701 (e.g., control systems for robotic arms, lathes, air compressors, etc.) are communicatively coupled to a network 700 (e.g., local area network (LAN), wide area network (WAN)) through the corresponding robotic hardware controller, which is connected to a management apparatus 702. The management apparatus 702 manages a database 703, which contains historical data collected from the robotic control systems 701 and also facilitates remote control to each of the robotic control systems 701. In alternate example implementations, the data from the robotic systems can be stored to a central repository or central database such as proprietary databases that intake data from robotic control systems 701, or systems such as enterprise resource planning systems, and the management apparatus 702 can access or retrieve the data from the central repository or central database.

Figure 8:
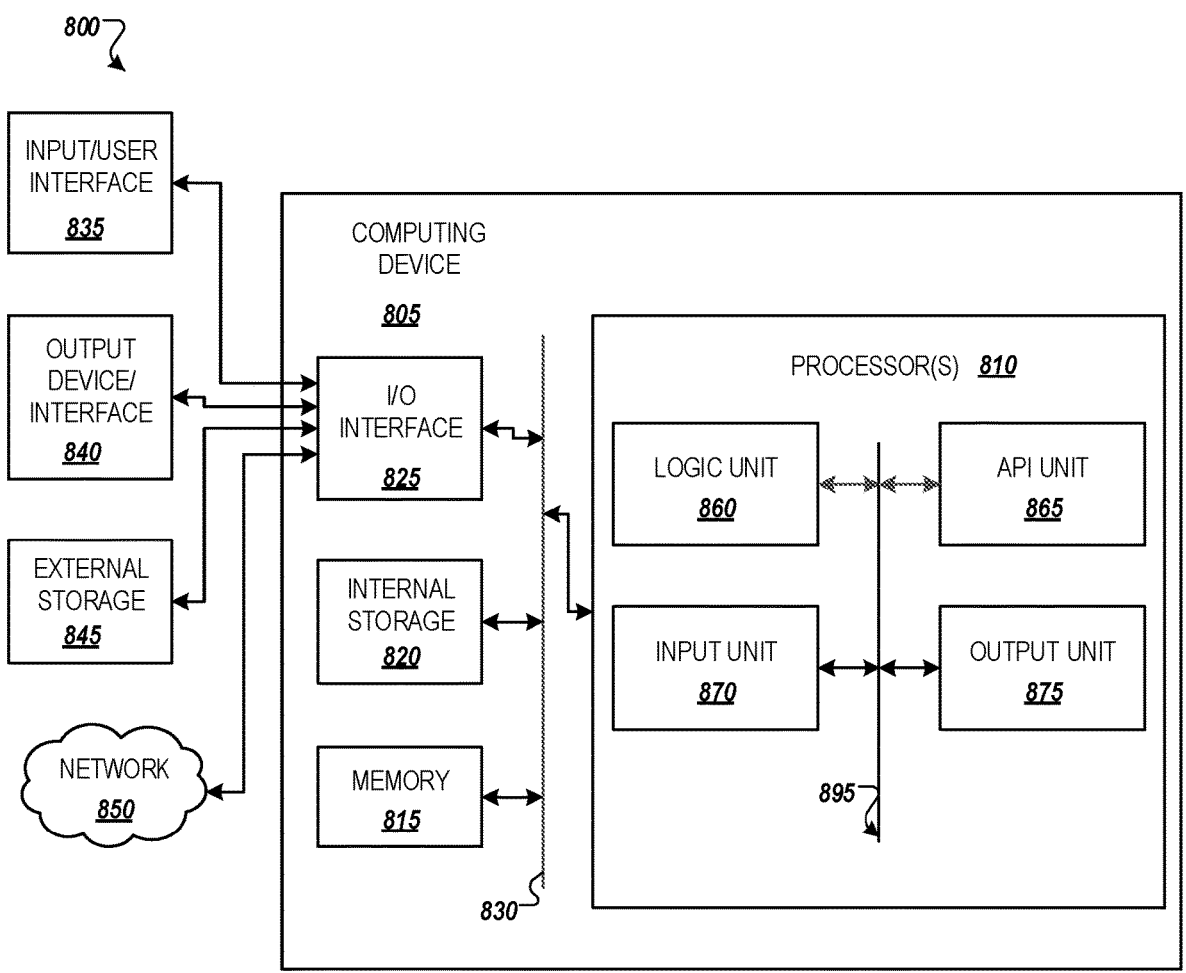
FIG. 8 illustrates an example computing environment with an example computer device suitable for use in some example implementations.

FIG. 8 illustrates an example computing environment with an example computer device suitable for use in some example implementations, such as a management apparatus as illustrated in FIG. 7. Computer device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computer device 805. I/O interface 825 is also configured to receive images from cameras or provide images to projectors or displays, depending on the desired implementation.

Computer device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computer device 805. In other example implementations, other computer devices may function as or provide the functions of input/user interface 835 and output device/interface 840 for a computer device 805.

Examples of computer device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 805 can be communicatively coupled (e.g., via I/O interface 825) to external storage 845 and network 850 for communicating with any number of networked components, devices, and systems, including one or more computer devices of the same or different configuration. Computer device 805 or any connected computer device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computer device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, and inter-unit communication mechanism 895 for the different units to communicate with each other, with the OS, and with other applications (not shown). The described units and elements can be varied in design, function, configuration, or implementation and are not limited to the descriptions provided. Processor(s) 810 can be in the form of hardware processors such as central processing units (CPUs) or in a combination of hardware and software units.

In some example implementations, when information or an execution instruction is received by API unit 865, it may be communicated to one or more other units (e.g., logic unit 860, input unit 870, output unit 875). In some instances, logic unit 860 may be configured to control the information flow among the units and direct the services provided by API unit 865, input unit 870, output unit 875, in some example implementations described above. For example, the flow of one or more processes or implementations may be controlled by logic unit 860 alone or in conjunction with API unit 865. The input unit 870 may be configured to obtain input for the calculations described in the example implementations, and the output unit 875 may be configured to provide output based on the calculations described in example implementations.

Processor(s) 810 can be configured to provide a reward to a machine learning algorithm controlling the one or more robotic control systems, the processor configured to receive an image 105, and a task description 104 defined in text; slice the image into a plurality of sub-images as illustrated in FIG. 2; execute an embedding model to embed the text of the task description and the sub-images to generate a distribution for the sub-images based on relevance to the task description; and generate the reward from the distribution for the sub-images as illustrated in FIGS. 2 to 4.

Processor(s) 810 can be configured to receive a selection of text for the task description for updating the task description; and update the task description based on the selection of text as illustrated in FIG. 3.

Processor(s) 810 can be configured to update the task description based on the selection of text by optimizing the selection of the text, the optimizing the selection of the text involving extracting, from a database of images, a set of images associated with successful episodes resulting from output of the machine learning algorithm; extracting, from the set of images, another set of images that correspond to goals related to the selection of text; executing a semantic extractor on the another set of images and the selection of text to produce an embedding of the another set of images and the selection of the text in a semantic space; determining a closest point in the semantic space to the another set of images and the selection of the text; and generating the updated task description from the optimized point in the semantic space, the updated task description comprising a vector in the semantic space as illustrated at 103 of FIG. 3.

Processor(s) 810 can be configured to execute an embedding model to embed the text of the task description and the sub-images to generate a distribution for the sub-images based on relevance to the task description by computing similarity scores between embeddings of the sub-images and the task description; generating the distribution, the distribution indicative of a probability of each of the sub-images being relevant to the task description; wherein the generating the reward from the distribution for the sub-images comprises generating the reward based on entropy of the distribution as illustrated in FIGS. 4 and 5.

Depending on the desired implementation, the reward is provided to the one or more robotic control systems, wherein the machine learning algorithm processes the reward to update a policy for a given state of the machine learning algorithm as illustrated in FIG. 6.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for providing a reward to a machine learning algorithm, comprising:

receiving an image, and a task description defined in text;

slicing the image into a plurality of sub-images;

executing an embedding model to embed the text of the task description and the sub-images to generate a distribution for the sub-images based on relevance to the task description;

generating the reward from the distribution for the sub-images; and in response to receiving a selection of text for the task description, update the task description based on the selection of text by performing steps comprising:

extracting, from a database of images, a set of images associated with successful episodes resulting from output of the machine learning algorithm;

extracting, from the set of images, another set of images that correspond to goals related to the selection of text;

executing a semantic extractor on the another set of images and the selection of text to produce an embedding of the another set of images and the selection of the text in a semantic space;

determining a closest point in the semantic space to the another set of images and the selection of the text; and generating an updated task description from the closest point in the semantic space, the updated task description comprising a vector in the semantic space.

2. The method of claim 1, further comprising:

computing similarity scores between embeddings of the sub-images and the task description; and generating the distribution, the distribution indicative of a probability of each of the sub- images being relevant to the task description, wherein the generating the reward from the distribution for the sub-images comprises generating the reward based on entropy of the distribution.

3. The method of claim 1, wherein the reward is provided to a robotic control system, wherein the machine learning algorithm processes the reward to update a policy for a given state of the machine learning algorithm.

4. A non-transitory computer readable medium, storing instructions for providing a reward to a machine learning algorithm, the instructions comprising:

receiving an image, and a task description defined in text;

slicing the image into a plurality of sub-images;

executing an embedding model to embed the text of the task description and the sub-images to generate a distribution for the sub-images based on relevance to the task description; generating the reward from the distribution for the sub-images; and in response to receiving a selection of text for the task description, update the task description based on the selection of text by performing steps comprising:

extracting, from a database of images, a set of images associated with successful episodes resulting from output of the machine learning algorithm;

extracting, from the set of images, another set of images that correspond to goals related to the selection of text;

executing a semantic extractor on the another set of images and the selection of text to produce an embedding of the another set of images and the selection of the text in a semantic space:

determining a closest point in the semantic space to the another set of images and the selection of the text; and generating an updated task description from the closest point in the semantic space, the updated task description comprising a vector in the semantic space.

5. The non-transitory computer readable medium of claim 4, wherein the executing an embedding model to embed the text of the task description and the sub- images to generate a distribution for the sub-images based on relevance to the task description comprises:

computing similarity scores between embeddings of the sub-images and the task description; and generating the distribution, the distribution indicative of a probability of each of the sub- images being relevant to the task description, wherein the generating the reward from the distribution for the sub-images comprises generating the reward based on entropy of the distribution.

6. The non-transitory computer readable medium of claim 4, wherein the reward is provided to a robotic control system, wherein the machine learning algorithm processes the reward to update a policy for a given state of the machine learning algorithm.

7. A system, comprising:

one or more robotic control systems, the one or more robotic control systems configured to control one or more robots; and an apparatus, comprising:

a processor configured to provide a reward to a machine learning algorithm controlling the one or more robotic control systems, the processor configured to:

receive an image, and a task description defined in text;

slice the image into a plurality of sub-images;

execute an embedding model to embed the text of the task description and the sub- images to generate a distribution for the sub-images based on relevance to the task description:

generate the reward from the distribution for the sub-images; and in response to receiving a selection of text for the task description, update the task description based on the selection of text by performing steps comprising:

extracting, from a database of images, a set of images associated with successful episodes resulting from output of the machine learning algorithm;

extracting, from the set of images, another set of images that correspond to goals related to the selection of text:

executing a semantic extractor on the another set of images and the selection of text to produce an embedding of the another set of images and the selection of the text in a semantic space:

determining a closest point in the semantic space to the another set of images and the selection of the text; and generating an updated task description from the closest point in the semantic space, the updated task description comprising a vector in the semantic space.

8. The system of claim 7, wherein the processor is further configured to compute similarity scores between embeddings of the sub-images and the task description; and generate the distribution, the distribution indicative of a probability of each of the sub-images being relevant to the task description, wherein generating the reward from the distribution for the sub-images comprises generating the reward based on entropy of the distribution.

9. The system of claim 7, wherein the reward is provided to the one or more robotic control systems, wherein the machine learning algorithm processes the reward to update a policy for a given state of the machine learning algorithm.

* * * * *